United States Patent
Raemy et al.

(10) Patent No.: US 10,102,203 B2
(45) Date of Patent: *Oct. 16, 2018

(54) METHOD FOR WRITING A FOREIGN LANGUAGE IN A PSEUDO LANGUAGE PHONETICALLY RESEMBLING NATIVE LANGUAGE OF THE SPEAKER

(71) Applicant: VERISIGN, INC., Reston, VA (US)

(72) Inventors: Vincent Raemy, Fribourg (CH); Vincenzo Russo, Belp (CH); Jean Hennebert, Thun (CH); Baptiste Wicht, Bonnefontaine (CH)

(73) Assignee: VERISIGN, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/977,022

(22) Filed: Dec. 21, 2015

(65) Prior Publication Data
US 2017/0177569 A1    Jun. 22, 2017

(51) Int. Cl.
*G06F 17/28* (2006.01)
*G06F 17/27* (2006.01)

(52) U.S. Cl.
CPC ...... *G06F 17/2836* (2013.01); *G06F 17/2705* (2013.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 5,429,513 A * 7/1995 Diaz-Plaza .............. G09B 1/00
273/302
5,588,056 A   12/1996 Ganesan
(Continued)

FOREIGN PATENT DOCUMENTS

EP    2592570 A2    5/2013
EP    2913986 A1    9/2015

OTHER PUBLICATIONS

Verisign Labs Tech Talk, Exascale Data and International Domain Phonetics [online video file], Jun. 2014 https://www.verisign.com/en_US/company-information/verisign-labs/speakers-series/exascale/index.xhtml, Hennebert et al., minutes 7:39-24:52.*

(Continued)

*Primary Examiner* — Lamont Spooner
(74) *Attorney, Agent, or Firm* — MH2 Technology Law Group, LLP

(57) ABSTRACT

Provided is a method, device, and computer-readable medium for converting a string of characters in a first language into a phonetic representation of a second language using a first data structure that maps graphemes in the first language to one or more universal phonetic representations based on an international phonetic alphabet, wherein the first data structure comprises a plurality of first nodes with each first node of the plurality of first nodes having a respective weight assigned that corresponds to a likely pronunciation of a grapheme, and a second data structure that maps the one or more universal phonetic representations to one or more graphemes in the second language, wherein the second data structure comprises a plurality of second nodes with each second node of the plurality of second nodes having a respective weight assigned that corresponds to a likely representation of a grapheme in the second language.

18 Claims, 15 Drawing Sheets

(58) Field of Classification Search
CPC .. G06F 17/272; G06F 17/2725; G06F 17/273;
G06F 17/2735; G06F 17/274; G06F
17/2745; G06F 17/275; G06F 17/2755;
G06F 17/276; G06F 17/2765; G06F
17/2795; G06F 17/28; G06F 17/2809;
G06F 17/2818; G06F 17/2827; G06F
17/2836; G06F 17/2845; G06F 17/2854;
G06F 17/2863; G06F 17/2872; G06F
17/289; G06F 17/2881; G10L 15/18
USPC .................................. 704/1, 9, 10, 257, 2–8
See application file for complete search history.

(56) References Cited

U.S. PATENT DOCUMENTS

| | | | |
|---|---|---|---|
| 5,592,585 A * | 1/1997 | Van Coile | G10L 13/02 704/206 |
| 5,850,448 A | 12/1998 | Ganesan | |
| 6,018,736 A * | 1/2000 | Gilai | G06F 17/30654 |
| 6,078,885 A | 6/2000 | Beutnagel | |
| 6,108,627 A * | 8/2000 | Sabourin | G10L 15/187 704/10 |
| 6,298,341 B1 | 10/2001 | Mann et al. | |
| 6,347,295 B1 * | 2/2002 | Vitale | G10L 13/08 704/209 |
| 6,557,026 B1 * | 4/2003 | Stephens, Jr. | H04M 3/4938 704/258 |
| 7,171,362 B2 * | 1/2007 | Hain | G10L 13/08 704/241 |
| 7,188,138 B1 | 3/2007 | Schneider | |
| 7,292,980 B1 | 11/2007 | August et al. | |
| 7,406,417 B1 * | 7/2008 | Hain | G10L 13/08 704/260 |
| 7,539,774 B2 | 5/2009 | Stahura | |
| 7,784,026 B1 | 8/2010 | Wong | |
| 8,060,565 B1 * | 11/2011 | Swartz | G10L 13/00 704/4 |
| 8,291,048 B2 | 10/2012 | Cartmell et al. | |
| 8,356,081 B2 | 1/2013 | Broadhurst et al. | |
| 8,812,300 B2 | 8/2014 | Gillam et al. | |
| 8,855,998 B2 | 10/2014 | Gillam et al. | |
| 8,909,558 B1 | 12/2014 | Nicks et al. | |
| 9,058,393 B1 | 6/2015 | Nicks et al. | |
| 2002/0046025 A1 * | 4/2002 | Hain | G10L 13/08 704/243 |
| 2002/0049591 A1 * | 4/2002 | Hain | G10L 13/08 704/243 |
| 2002/0083029 A1 | 6/2002 | Chun et al. | |
| 2004/0059574 A1 | 3/2004 | Ma et al. | |
| 2006/0031579 A1 | 2/2006 | Tout | |
| 2006/0149543 A1 * | 7/2006 | Lassalle | G06F 17/273 704/235 |
| 2006/0195319 A1 * | 8/2006 | Prous Blancafort | G10L 15/18 704/235 |
| 2006/0215821 A1 * | 9/2006 | Rokusek | G10L 15/22 379/88.01 |
| 2006/0265220 A1 * | 11/2006 | Massimino | G10L 13/08 704/235 |
| 2007/0016421 A1 * | 1/2007 | Nurminen | G10L 13/08 704/260 |
| 2007/0055515 A1 * | 3/2007 | Lassalle | G10L 13/08 704/243 |
| 2007/0073542 A1 * | 3/2007 | Chittaluru | G10L 13/07 704/260 |
| 2007/0083369 A1 | 4/2007 | McCuller | |
| 2007/0112569 A1 * | 5/2007 | Wang | G10L 13/08 704/260 |
| 2007/0118377 A1 * | 5/2007 | Badino | G10L 13/08 704/260 |
| 2007/0150279 A1 * | 6/2007 | Gandhi | G10L 13/08 704/258 |
| 2007/0233490 A1 | 10/2007 | Yao | |
| 2008/0201487 A1 | 8/2008 | Blinn et al. | |
| 2009/0254545 A1 | 10/2009 | Fisken | |
| 2009/0265171 A1 | 10/2009 | Davis | |
| 2010/0010815 A1 | 1/2010 | Bells et al. | |
| 2010/0131267 A1 * | 5/2010 | Silbert | G10L 13/06 704/10 |
| 2010/0153115 A1 | 6/2010 | Klee et al. | |
| 2010/0217842 A1 | 8/2010 | Shuster | |
| 2010/0299133 A1 * | 11/2010 | Kopparapu | G06F 17/289 704/2 |
| 2010/0325128 A1 | 12/2010 | Adelman et al. | |
| 2010/0325253 A1 | 12/2010 | Adelman et al. | |
| 2011/0093259 A1 * | 4/2011 | Saffer | G10L 15/06 704/9 |
| 2011/0208800 A1 | 8/2011 | Nicks | |
| 2011/0250570 A1 | 10/2011 | Mack | |
| 2011/0313762 A1 * | 12/2011 | Ben-David | G10L 13/08 704/231 |
| 2012/0005571 A1 | 1/2012 | Tang et al. | |
| 2012/0046948 A1 | 2/2012 | Leddy et al. | |
| 2012/0084281 A1 | 4/2012 | Colosi | |
| 2012/0116778 A1 * | 5/2012 | Fleizach | G10L 13/0335 704/271 |
| 2012/0173490 A1 | 7/2012 | Gould et al. | |
| 2012/0271878 A1 | 10/2012 | Nicks et al. | |
| 2013/0091143 A1 | 4/2013 | Raemy et al. | |
| 2013/0117013 A1 | 5/2013 | Mugali, Jr. et al. | |
| 2013/0132069 A1 * | 5/2013 | Wouters | G06F 17/28 704/8 |
| 2013/0211821 A1 | 8/2013 | Tseng et al. | |
| 2013/0231917 A1 | 9/2013 | Naik | |
| 2013/0253903 A1 * | 9/2013 | Stephen | G06F 17/27 704/2 |
| 2014/0074470 A1 | 3/2014 | Jansche et al. | |
| 2014/0222415 A1 * | 8/2014 | Legat | G10L 13/08 704/8 |
| 2014/0379709 A1 | 12/2014 | Mack | |
| 2015/0249640 A1 | 9/2015 | Yacoub | |
| 2015/0269646 A1 | 9/2015 | Borges et al. | |
| 2016/0004748 A1 | 1/2016 | Botchen | |
| 2016/0078859 A1 | 3/2016 | Luan et al. | |
| 2016/0093284 A1 * | 3/2016 | Begum | G06K 9/00315 704/260 |
| 2016/0188727 A1 | 6/2016 | Waibel et al. | |
| 2016/0358596 A1 | 12/2016 | Singh et al. | |

OTHER PUBLICATIONS

Non-Final Office Action dated Jan. 27, 2017, U.S. Appl. No. 14/977,133, pp. 1-30.
Verisign Labs Distinguished Speakers Series, Speakers Professor Jean Hennebert and Professor Philippe Cudré-Mauroux, "Exascale Data and International Domain Phonetics—Two Swiss University Collaborations at Verisign EMEA", Jun. 26, 2014, Retrieved from the internet: https://www.verisign.com/en_US/company-information/verisign-labs/speakers-series/exascale/index.xhtml, Slides from presentation pp. 1-13.
Vincent Raemy et al., "Construction of Phonetic Representation of a String of Characters", U.S. Appl. No. 14/976,968, filed Dec. 21, 2015, pp. 1-37.
Vincent Raemy et al., "Construction of Phonetic Representation of a Generated String of Characters", U.S. Appl. No. 14/977,090, filed Dec. 21, 2015, pp. 1-42.
Vincent Raemy et al., "Systems and Methods for Automatic Phonetization of Domain Names", U.S. Appl. No. 14/977,133, filed Dec. 21, 2015, pp. 1-49.
Extended European Search Report dated May 10, 2017, European Application No. 16205824.2, pp. 1-8.
Extended European Search Report dated May 17, 2017, European Application No. 16205843.2, pp. 1-8.
Extended European Search Report dated May 26, 2017, European Application No. 16205852.3, pp. 1-9.
Joong-Hoon Oh et al., "A Comparison of Different Machine Transliteration Models", Journal of Artificial Intelligence Research, vol. 27, 2006, pp. 119-151.

(56) References Cited

OTHER PUBLICATIONS

Walter Daelemans et al., "IGTree: Using Trees for Compression and Classification in Lazy Learning Algorithms", Artificial intelligence review vol. 11, No. 1-5, 1997, pp. 407-423.
Walter Daelemans et al., "Language-Independent Data-Oriented Grapheme-to-Phoneme Conversion", Progress in speech synthesis, Springer New York, 1997, pp. 77-89.
Sarvnaz Karimi et. al., "Machine Transliteration Survey", ACM Computing Surveys, vol. 43, No. 3, Article 17, Apr. 2011, pp. 1-46.
Amalia Zahra et al., "English to Indonesian Transliteration to Support English Pronunciation Practice", Proceedings of the Eighth International Conference on Language Resources and Evaluation, May 1, 2012, pp. 4132-4135.
PTO Notice of Allowance dated Dec. 12, 2017, U.S. Appl. No. 14/977,133, pp. 1-21.
PTO Final Office Action dated Jul. 20, 2017, U.S. Appl. No. 14/977,133, pp. 1-34.
Heather Crawford et al., "Kwyjibo: automatic domain name generation", Software Practice and Experience, vol. 38, No. 14, 2008, pp. 1561-1567.
Anonymous, "n-gram", from Wikipedia—the free encyclopedia, Retrieved from the internet on Jul. 28, 2015: https://en.wikipedia.org/w/index.php?title=N-gram&oldid=583934400, pp. 1-6.
Extended European Search Report dated Aug. 4, 2015, European Application No. 15159846.3, pp. 1-9.
Chmielowiec et al., "Technical Challenges in Market-Driven Automated Service Provisioning," MW4SOC '08, Dec. 1, 2008, Leuven, Belgium, 6 pages.
Braga et al., "Mashing Up Search Services," IEEE Internet Computing, 1089-7801/08, vol. 12, Issue 5, Sep./Oct. 2008, IEEE Computer Society, ISDN: 978-3-540-26918, pp. 16-23.
PTO Final Office Action dated Feb. 5, 2018, U.S. Appl. No. 14/282,529, pp. 1-41.

\* cited by examiner

100

1: *ps* ← phonetizations from the phonetic dictionary
2: *bs* ← bootstrap phonetizations
3: *estimator* ← new discrete estimator
4: for all phonetization *p* in *bs* do
5: Update *estimator* based on *p*
6: end for
7: while new words are aligned do
8: new_estimator ← new discrete estimator
9: for all phonetization *p* in *ps* do
10: *hmm* ← new hmm containing all phonetic decomposition
11: *path* ← best path using NBest on *hmm* and *estimator*
12: if path exists then
13: Update *new_estimator* based on path
14: end if
15: end for
16: *estimator* ← *new_estimator*
17: end while

FIG. 1

1: $D \leftarrow$ maximum depth of the tree
2: *alignments* $\leftarrow$ alignments from the previous step
3: *possible* $\leftarrow$ all possible keys from the *alignments*
4: *root* $\leftarrow$ new IG-Tree node
5: for all $g$ in *possible* do
6: Add new son with key $g$ to root
7: end for
8: for all $a$ in *alignments* do
9: Update values in tree from *root* using the values of $a$
10: end for
11: for $i$ in [1,D] do
12: for all $a$ in *alignments* do
13: Create new sons to *root* to create path for $a$ up to level $i$
14: end for
15: for all $a$ in *alignments* do
16: Update values in tree from *root* using the values of $a$
17: end for
18: end for

FIG. 3

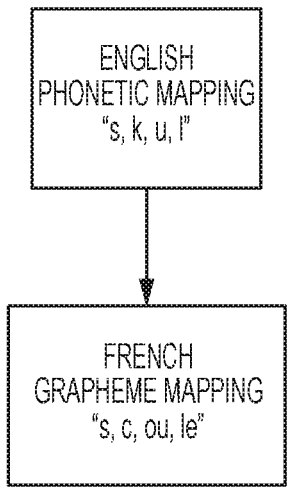
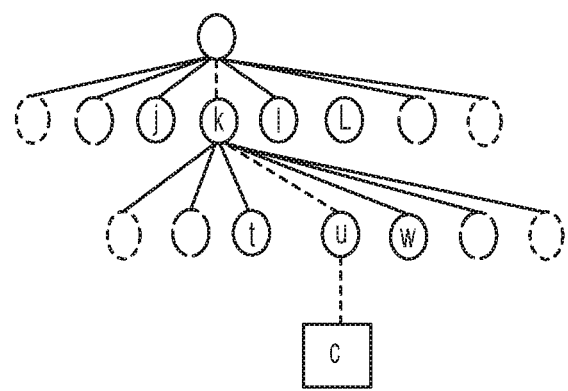
FIG. 12

METHOD FOR WRITING A FOREIGN LANGUAGE IN A PSEUDO LANGUAGE PHONETICALLY RESEMBLING NATIVE LANGUAGE OF THE SPEAKER

FIELD

The present disclosure relates generally to systems and methods for transliteration from one language to another language using a phonetic context of both languages.

BACKGROUND

Translation and transliteration from a first language to a second language is typically done on a character-by-character basis without accounting for phonetic language characteristics or knowledge of a person requesting such services of the second language. This can lead to the person incorrectly pronouncing the word in the second language due to not knowing the correct pronunciation rules of the second language.

There is therefore a need for systems and methods for overcoming these and other problems presented by the prior art.

SUMMARY

In accordance with the present teachings, a method of converting a string of characters in a first language into a phonetic representation of a second language is provided. The method can comprise receiving the string of characters in the first language; parsing the string of characters in the first language into string of graphemes in the first language; accessing a first data structure that maps graphemes in the first language to one or more universal phonetic representations based on an international phonetic alphabet, wherein the first data structure comprises a plurality of first nodes with each first node of the plurality of first nodes having a respective weight assigned that corresponds to a likely pronunciation of a grapheme; determining one or more phonetic representations for one or more graphemes in the string of graphemes in the first language based on the first data structure; accessing a second data structure that maps the one or more universal phonetic representations to one or more graphemes in the second language, wherein the second data structure comprises a plurality of second nodes with each second node of the plurality of second nodes having a respective weight assigned that corresponds to a likely representation of a grapheme in the second language; determining at least one grapheme representation in the second language for one or more of the one or more phonetic representation based on the second data structure; and constructing the phonetic representation of the string of characters in the second language based on the grapheme representation in the second language that was determined.

In some aspects, the method can further comprise ranking each grapheme representation in the second language to produce a rank list, wherein the ranking is based on a likelihood that a grapheme representation in the second language sounds similar to a pronunciation sound of the string of characters in the second language; and filtering the ranked list to produce a subset of graphene representations in the second language.

In some aspects, the method can further comprise creating the first data structure and the second data structure as information gain trees.

In some aspects, the method can further comprise determining a first composite weight for the one or more phonetic representations based on the first data structure.

In some aspects, the method can further comprise determining a second composite weight for the one or more grapheme representations based on the second data structure.

In some aspects, the filtering can be based on the second composite weight.

In accordance with the present teachings, a device for converting a string of characters in a first language into a phonetic representation of a second language is provided. The device can comprise a memory containing instructions; and at least one processor, operably connected to the memory, the executes the instructions to perform operations comprising receiving the string of characters in the first language; parsing the string of characters in the first language into string of graphemes in the first language; accessing a first data structure that maps graphemes in the first language to one or more universal phonetic representations based on an international phonetic alphabet, wherein the first data structure comprises a plurality of first nodes with each first node of the plurality of first nodes having a respective weight assigned that corresponds to a likely pronunciation of a grapheme; determining one or more phonetic representations for one or more graphemes in the string of graphemes in the first language based on the first data structure; accessing a second data structure that maps the one or more universal phonetic representations to one or more graphemes in the second language, wherein the second data structure comprises a plurality of second nodes with each second node of the plurality of second nodes having a respective weight assigned that corresponds to a likely representation of a grapheme in the second language; determining at least one grapheme representation in the second language for one or more of the one or more phonetic representation based on the second data structure; and constructing the phonetic representation of the string of characters in the second language based on the grapheme representation in the second language that was determined.

In some aspects, the at least one processor is further operable to perform the method comprising ranking each grapheme representation in the second language to produce a rank list, wherein the ranking is based on a likelihood that a grapheme representation in the second language sounds similar to a pronunciation sound of the string of characters in the second language; and filtering the ranked list to produce a subset of graphene representations in the second language.

In some aspects, the at least one process is further operable to perform the method comprising creating the first data structure and the second data structure as information gain trees.

In some aspects, the at least one processor is further operable to perform the method comprising determining a first composite weight for the one or more phonetic representations based on the first data structure.

In some aspects, the at least one processor is further operable to perform the method comprising determining a second composite weight for the one or more grapheme representations based on the second data structure.

In some aspects, the filtering is based on the second composite weight.

In accordance with the present teachings, a computer-readable medium comprising computer-interpretable instructions which, when executed by at least one electronic processor, cause the at least one electronic processor to perform a method of converting a string of characters in a first language into a phonetic representation of a second language, the method comprising receiving the string of characters in the first language; parsing the string of characters in the first language into string of graphemes in the first language; accessing a first data structure that maps graphemes in the first language to one or more universal phonetic representations based on an international phonetic alphabet, wherein the first data structure comprises a plurality of first nodes with each first node of the plurality of first nodes having a respective weight assigned that corresponds to a likely pronunciation of a grapheme; determining one or more phonetic representations for one or more graphemes in the string of graphemes in the first language based on the first data structure; accessing a second data structure that maps the one or more universal phonetic representations to one or more graphemes in the second language, wherein the second data structure comprises a plurality of second nodes with each second node of the plurality of second nodes having a respective weight assigned that corresponds to a likely representation of a grapheme in the second language; determining at least one grapheme representation in the second language for one or more of the one or more phonetic representation based on the second data structure; and constructing the phonetic representation of the string of characters in the second language based on the grapheme representation in the second language that was determined.

In some aspects, the computer-readable medium further comprises ranking each grapheme representation in the second language to produce a rank list, wherein the ranking is based on a likelihood that a grapheme representation in the second language sounds similar to a pronunciation sound of the string of characters in the second language; and filtering the ranked list to produce a subset of graphene representations in the second language.

In some aspects, the computer-readable medium further comprises creating the first data structure and the second data structure as information gain trees.

In some aspects, the computer-readable medium further comprises determining a first composite weight for the one or more phonetic representations based on the first data structure.

In some aspects, the computer-readable medium further comprises determining a second composite weight for the one or more grapheme representations based on the second data structure.

It is to be understood that both the foregoing general description and the following detailed description are exemplary and explanatory only and are not restrictive of the disclosure, as claimed.

BRIEF DESCRIPTION OF THE DRAWINGS

The drawings are not necessarily to scale. Instead, emphasis is generally placed upon illustrating the principles of the disclosures described herein. The accompanying drawings, which are incorporated in and constitute a part of this specification, illustrate several embodiments consistent with the disclosures and together with the description, serve to explain the principles of the disclosures. In the drawings:

FIG. 1 shows an example algorithm for a bootstrap procedure, according to embodiments.

FIG. 3 shows an example of a training algorithm that can be used once the alignments have been generated to generate the IG-Trees, according to embodiments.

FIG. 12 shows an example IG-Tree for finding the best graphene in French for the phoneme "k" from the example of FIG. 6, according to embodiments.

DETAILED DESCRIPTION

Figure 2:
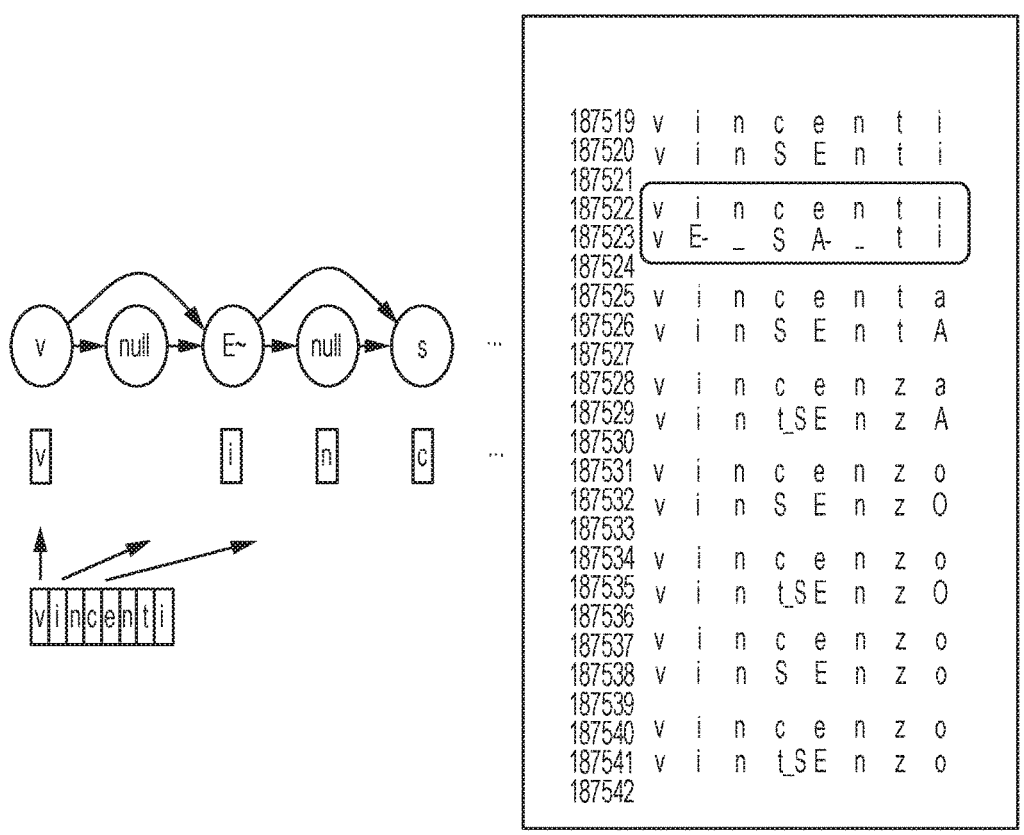
FIG. 2 shows an example alignment process for the word "vincenti" and its phonetization from the dictionary, according to embodiments.

The following detailed description refers to the accompanying drawings. Wherever possible, the same reference numbers are used in the drawings and the following description to refer to the same or similar parts. Also, similarly-named elements perform similar functions and are similarly designed, unless specified otherwise. Numerous details are set forth to provide an understanding of the embodiments described herein. The embodiments may be practiced without these details. In other instances, well-known methods, procedures, and components have not been described in detail to avoid obscuring the embodiments described. While several exemplary embodiments and features are described herein, modifications, adaptations, and other implementations are possible, without departing from the spirit and scope of the disclosure. Accordingly, the following detailed description does not limit the disclosure. Instead, the proper scope of the disclosure is defined by the appended claims.

In accordance with aspects consistent with the present disclosure, a method, system, and computer-readable medium are provided that converts a first language into an easier to pronounce phonetic-based transliteration of a second language. For example, consider a native speaker of a language (A) and this speaker needs to speak a foreign language (C) without having any notion of the language (C). The present techniques are able to take as input text in the language (C) and to produce an equivalent written text in a pseudo language {B} which resembles language (A) and that when is read by the speaker of the language (A) actually sounds like the foreign language (C) to a native speaker of the language (C). Continuing with the example, imagine an English tourist travelling to Russia and using a translation application. He wants to say "thank you." When translating to Russian, the translation application gives, under the Cyrillic translation, a latinization version such as spasibo. The English tourist pronouncing that word would not be understood, since the pronunciation is actually 'spasibah' (the last syllable without accent is read as 'ah', not as 'o'. The present techniques would provide the good phonetic transcription 'spasibah,' so that the tourist can read that word as if it was an English word (even if it does not make sense to him) and be understood, without the need to know Cyrillic or Russian tonal accent rules.

The present method, system, and computer-readable medium can use a processing chain that comprises two steps. The first of which is a grapheme-to-phoneme (g2p) conversion where the input is phonetize to produce N sequences of phonemes. The second step is a phoneme-to-grapheme (p2g) conversion where the sequences of phonemes are graphetized. For each input sequence, this second step produces M sequences of graphemes. The end-to-end system produces N*M results that can be scored, sorted, filtered and cleaned before presented to the final user.

The g2p conversion can use a first data structure can be used to convert graphemes in a first language to international phonemes and the p2g conversion can use a second data structure can then be used to convert those international phonemes into graphemes in a second language. The first and second data structures work by knowing which grapheme corresponds to which phoneme. For example, the first and second data structures can be represented as information gain (IG) Trees. Therefore, the phonetic transcription and the source grapheme are aligned together. Phonetic dictionaries typically do not provide this kind of information. Thus, alignment is trained from the phonetic dictionary. A bootstrap phase is used to align grapheme and phonemes together and it typically requires a phonetic dictionary as well as a first set of manually aligned phonetizations. Each group of graphemes is mapped to a group of phoneme. Since there are not always a 1-to-1 mapping between the two sets, phonemes or graphemes are grouped together before the alignment. These groups are called pseudos and there are pseudo-phonemes and pseudo-graphemes. For example, an alignment of the word "mckinney" can be m_c k i n_n e_y
m_a k k i n i In this example, the sequence of grapheme "ey" corresponds to the phoneme "i," this is why they are grouped together into a pseudo-grapheme "e_y". The manually aligned phonetizations can be read from a file. A discrete estimator can accumulate the probabilities of a given grapheme mapped to a specific phoneme. FIG. 1 shows an example algorithm for the bootstrap procedure. If some words are not aligned, it usually means that the manual alignment has to be completed to cover some mapping exceptions. The alignment only needs to be made once for each language. P2g or g2p mappers use the same alignment data. FIG. 2 shows an example alignment process for the word "vincenti" and its phonetization from the dictionary, according to embodiments.

FIG. 3 shows an example of a training algorithm that can be used once the alignments have been generated to generate the IG-Trees, according to embodiments. The process is described for the g2p mapper, but the process for p2g is exactly the same, replacing grapheme with phoneme and vice-versa. Each alignment needs to be read to populate the tree. The root level of the tree is not counted as an effective level.

Figure 4:
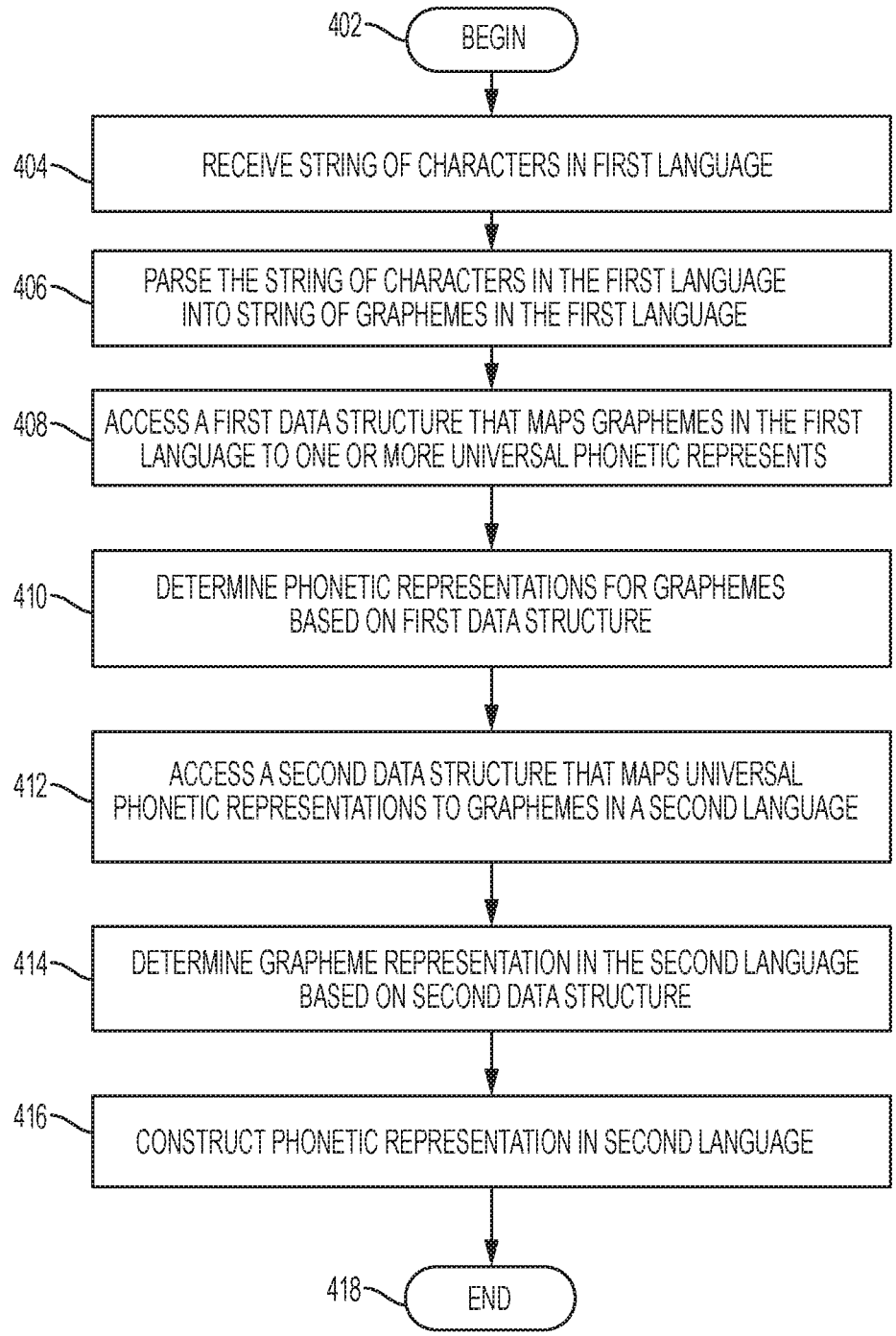
FIG. 4 shows an example method for converting a string of characters in a first language into a phonetic representation of a second language, according to embodiments.
Figure 5:
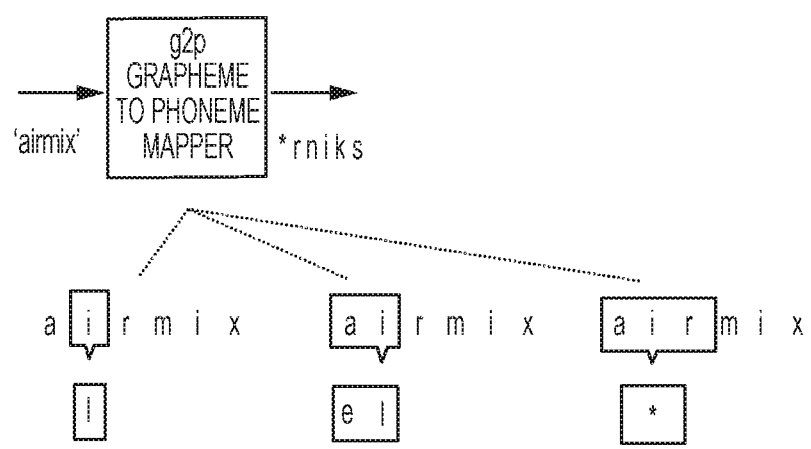
FIG. 5 shows an example of context utilization during phonetization, according to embodiments.
Figure 6:
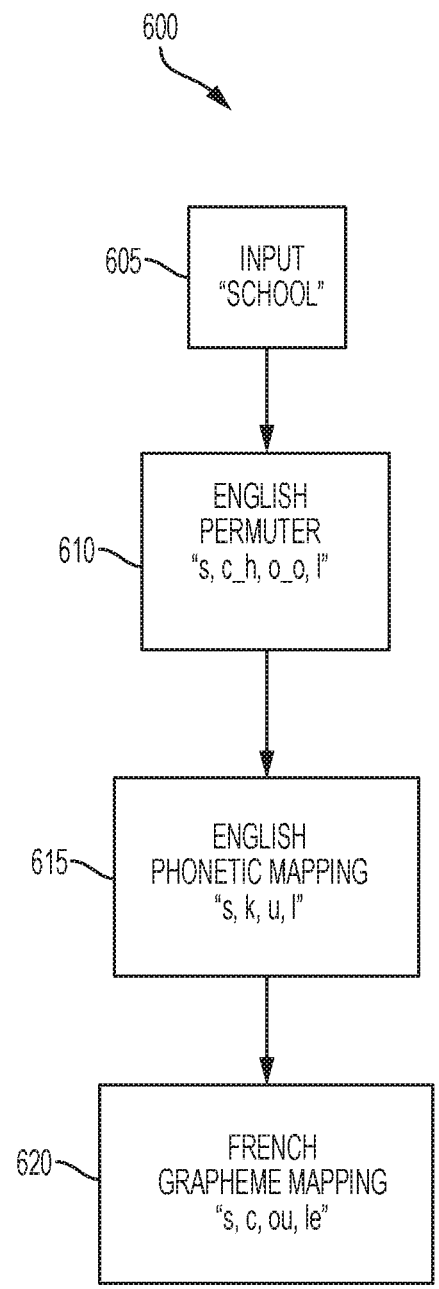
FIG. 6 shows an example of the grapheme-to-phoneme conversion for the word "school" from English to French, according to embodiments.

FIG. 4 and FIGS. 5-14 will be used together to show a general and a specific conversion process from a first language to a second language, according to embodiments. FIG. 4 shows an example method for converting a string of characters in a first language into a phonetic representation of a second language, according to embodiments. FIG. 6 shows an example of the grapheme-to-phoneme conversion method 600 for the word "school" from English to French, according to embodiments. For example, the method of FIG. 4 and FIG. 6 can be executed by a computer described below in FIG. 15. The computer can be a mobile device, such as a smart phone with a touch screen or microphone that can be used to receive input from the user. The method can begin at 402. At 404, the method continues by receiving the string of characters in the first language. In the mobile device example, the string of characters can be input as text or spoken to be received by the microphone of the mobile device. Returning to FIG. 6, the English word "school" is provided at 605.

Returning to FIG. 4, at 406, the method continues by parsing the string of characters in the first language into string of graphemes in the first language. For the example of FIG. 6, the word "school" is parsed into a string of graphemes "s, c_h, o_o, l" at 610, where c_h and o_o are pseudo-graphemes for the letter combination "ch" and "oo," which are phonetized together. For most languages, the parsing of the sting of characters is straightforward. However, there are some subtleties in some languages that use non-Latin characters that can make them more difficult to work with. For example, for Arabic, a diaphone/sub-syllable method can be used where the particular syllabic structure of Arabic words can be exploited. A general problem with Arabic is that it is written without vowels that are nonetheless pronounced. Therefore, it is often necessary to add those missing vowels to the text before being able to do any phonetic analysis on it. This can be done using a variety of approaches, including using a rule-based approach to handle vowelization of text where generic vowels are inserted into large dataset and trained with generic vowels. Other approaches include using a full morphological tagging procedure to perform automatic Arabic diacritization where a simple lexeme language model is used. Chinese comes with another set of difficulties. A general problem is the use of polyphonic characters, which makes phonetization more difficult. One approach for grapheme-to-phone conversion can include the following steps: the text is segmented in words and then two methods are used, hand-crafted rules and statistical decision lists. A stochastic decision based on an Extended Stochastic Complexity (ESC) can be used to perform G2P on Chinese.

At 408, the method continues by accessing a first data structure that maps graphemes in the first language to one or more universal phonetic representations based on an international phonetic alphabet. The first data structure can comprise a plurality of first nodes with each first node of the plurality of first nodes having a respective weight assigned that corresponds to a likely pronunciation of a grapheme.

The grapheme-to-phoneme (g2p) mapper transforms a particular input letter into its corresponding sound based on the correct context, a process called phonemization, which can be performed using a variety of techniques. For example, one technique is the use of hand-written phonological rules, where these rules are written by hand based on the knowledge of the system developer. Generally, these rules include the left and right context of the grapheme to assign it a phoneme. For instance, A/X/B→y means that X is phonetized as the sound y when it is between A and B. Another technique is to use a dictionary-based technique where words are provided with their corresponding phoneme sequence; however, this technique could have difficulty with Out-Of-Vocabulary (OOV) items that may be found in company names, proper names, and invented names. Another technique is to rely on data-driven techniques that can learn directly the rules from a phonetic dictionary. In this case, small amount of manual work is performed when a dictionary is available. There are many techniques that can be used for this conversion, including using statistical models to learn data-driven representations of the data, using machine learning algorithms, such as decision trees, pronunciation by analogy, neural networks, Hidden Markov Models (HMMs), information gain (IG) tree. In the IG tree approach, each level of the tree refines the context of the conversion where the deeper the tree, the more exact the conversion will be. The context includes letters to the left and right in the input word. The IG tree approach is language-independent. The g2p mapping of one letter is an efficient lookup in the tree. IG-tree requires some work to align source grapheme to destination phoneme, but this step can itself be automated using, for example, HMMs.

FIG. 5 shows an example of context utilization during phonetization, according to embodiments. When using no context or 1-left context, the "i" grapheme is mapped to the "I" phoneme. When 1-left and 1-right context is considered, the graphemes "air" should be taken together and can be represented by the phonetic symbol "*." As shown, the grapheme string "airmix" can be represented by the phonetic string "*rmIks" using the g2P grapheme to phoneme mapper. The depth of the tree is chosen by the training procedure. The deeper the tree will be, the more precise the results will be. On the other hand, deeper trees mean a larger size in memory and longer search time. After the creation of the tree is complete, its structure can be saved to the disk using Java serialization.

When doing phonetization of graphemes, the context can be considered. FIG. 5 shows a phonetization example where the result change based on how much context is included. An IG-Tree can give context-dependent answers. An IG-Tree is a tree data structure used to encode the context of a phonetization. Each node, excepted the root, has a key, indicating the search term. For the g2p mapper, the keys are graphemes and the values are phonemes. Each node has also a list of possible values and their likelihoods. Such a structure allows more or less context to be considered for the phonetization. Phonetization of grapheme is typically dependent on its context. The IG-Tree considers the left and right graphemes of the current element as the context to use to distinguish between the possible phonetizations. The depth of the tree indicates the size of the context that is taken into account. A search into the tree can be made in this manner. For a letter at the position i of the input word w, get the son of the root with the key w[i]. Then, as long as a node exists, you go down the tree. For odd levels, you get the letter to the left as the key and for even levels, you get the letter at the right as the key. Once there are no sons with the correct key, the final node is used as the result of the phonetic mapping. The search for one mapping is done in O(D) where D is the maximum depth of the tree. This depth is configured when training the tree and can be kept small for most languages, making a very fast search into the tree.

Figure 7:
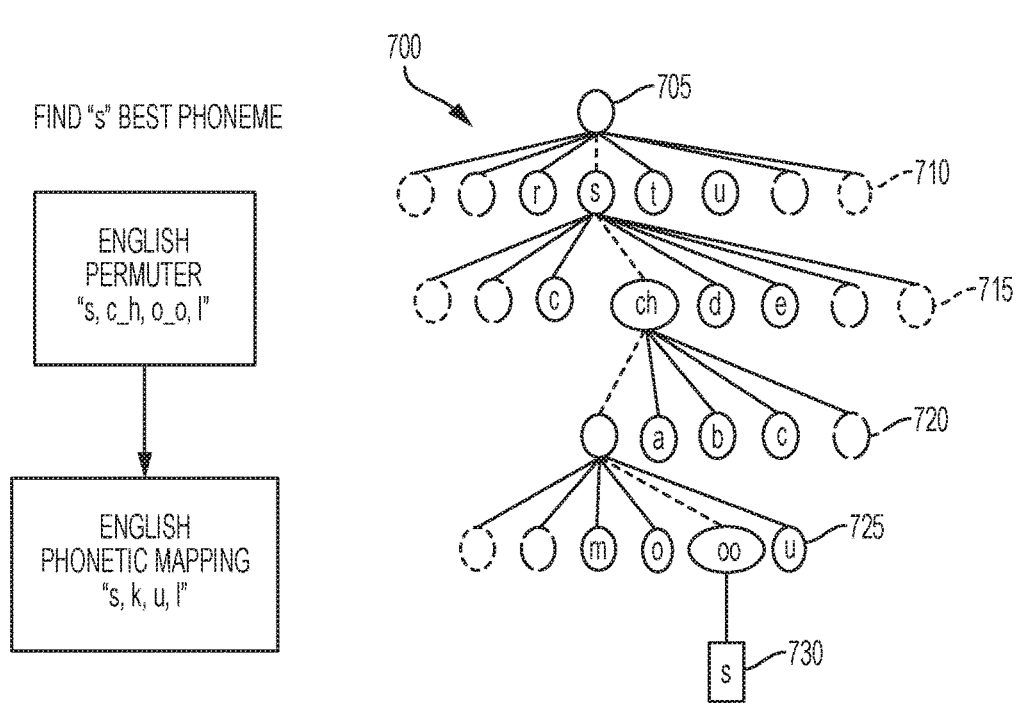
FIG. 7 shows an example IG-Tree for finding the best phoneme for the grapheme "s" from the example of FIG. 6, according to embodiments.

FIG. 7 shows an example IG-Tree 700 for finding the best phoneme for the grapheme "s" from the example of FIG. 6, according to embodiments. The IG-Tree 700 has a root node 705, a first layer 710, a second layer 715, a third layer 720, a fourth layer 725. To determine the best phoneme for the grapheme "s" in the first layer 710, the grapheme (in this case, pseudo-grapheme), at the right context location "c_h" is located in the second layer 715. Since there is no grapheme (or pseudo-grapheme) at the left context location (there is no grapheme to the left of "s"), a null node, represented by an empty circle, is located at the third layer 720. In the fourth layer 725, the pseudo-grapheme "o_o" to the right of the pseudo-grapheme "c_h" is located. At the node 730, the best phoneme, which is "s," is found for the grapheme "s."

Figure 8:
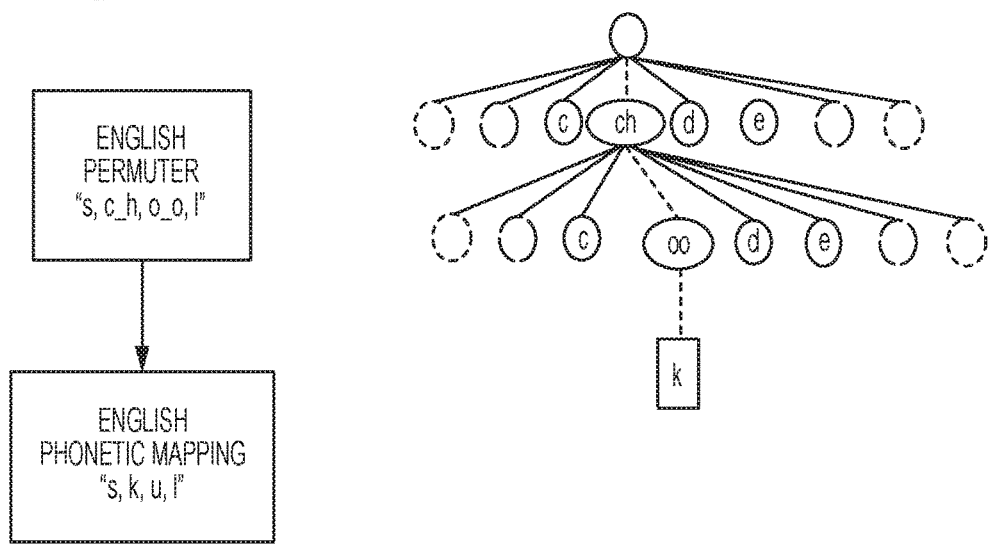
FIG. 8 shows an example IG-Tree for finding the best phoneme for the pseudo-grapheme "c_h" from the example of FIG. 6, according to embodiments.

FIG. 8 shows an example IG-Tree for finding the best phoneme for the pseudo-grapheme "c_h" from the example of FIG. 6, according to embodiments. The process of traversing the IG-Tree of FIG. 8 is similar to that of FIG. 7 and the best phoneme "k" is found for the pseudo-grapheme "c_h."

Figure 9:
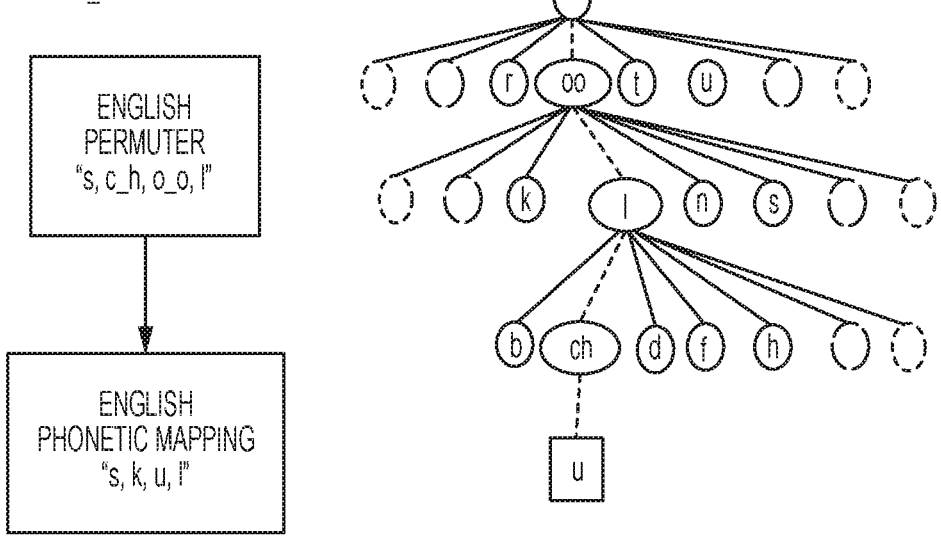
FIG. 9 shows an example IG-Tree for finding the best phoneme for the pseudo-grapheme "o_o" from the example of FIG. 6, according to embodiments.

FIG. 9 shows an example IG-Tree for finding the best phoneme for the pseudo-grapheme "o_o" from the example of FIG. 6, according to embodiments. The process of traversing the IG-Tree of FIG. 9 is similar to that of FIG. 7 and the best phoneme "u" is found for the pseudo-grapheme "o_o."

Figure 10:
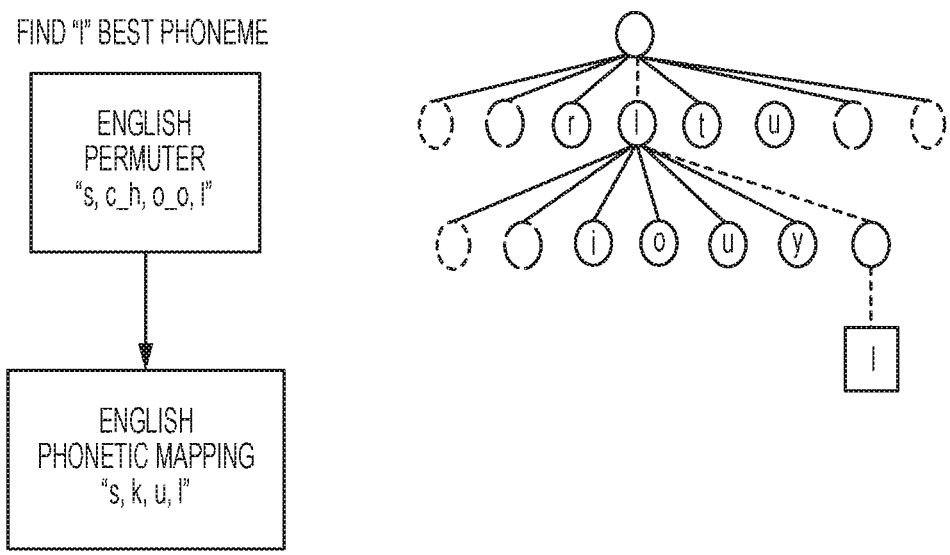
FIG. 10 shows an example IG-Tree for finding the best phoneme for the grapheme "l" from the example of FIG. 6, according to embodiments.

FIG. 10 shows an example IG-Tree for finding the best phoneme for the grapheme "l" from the example of FIG. 6, according to embodiments. The process of traversing the IG-Tree of FIG. 10 is similar to that of FIG. 7 and the best phoneme "l" is found for the grapheme "l."

Continuing with FIG. 4, at 410, the method continues by determining one or more phonetic representations for one or more graphemes in the string of graphemes in the first language based on the first data structure. Returning to FIG. 6, the phoneme string "s, k, u, l" is found for the grapheme string "s, c_h, o_o, l" at 615 using the IG-Trees of FIGS. 7-10.

As discussed above, the first data structure can be represented using a IG-Tree. There are two different ways to use the IG-Tree. For each way, the input sequence of grapheme is aligned into its best possible phonetic alignment. The input word is, in its simplest form, a sequence of single grapheme. However, some graphemes needs to be grouped together to form pseudo-graphemes. If only the best answer is necessary, the algorithm is simply a sequence of tree traversal. For each grapheme (or pseudo-grapheme), only one single traversal of the tree is necessary with the longest possible context (path in the tree). The resulting phoneme is the most probable phoneme in the found node. The resulting phoneme sequence is formed by the concatenation of the phonemes found previously. If the best answers are necessary, a N-Best algorithm can be used to find them. For that, an HMI can be built for the best possible phonemes at the final node in the tree path. The transition probabilities are set using grapheme bigram, gathered during the training. A discrete estimator can also be populated using the likelihoods of the phonemes at the final node in the tree path. Once these two components are created, a N-Best algorithm can be used to find the best paths.

As discussed above, in some instances, some graphemes are grouped together in order to be mapped correctly to the phonemes. For instance, double consonants are almost always phonetized together. So, it is necessary, to find the correct sequence of pseudo grapheme for the input sequence. In this implementation, a three-step process can be used: The first step is to generate all the possible permutations of the input sequence. This takes into accounts the list of the possible pseudo phonemes, learned during training. The second step is to remove some bad possible observations, also called pruning. Rules can be used to detect bad sequence, especially by detecting pseudo graphemes which should not be put together. This process can use the bigram probabilities to avoid bad starting pseudo grapheme and bad ending pseudo grapheme. The last step is to find the most probable sequence between the remaining permutations. Each sequence is assigned a score that is the multiplication of each bigram probability inside the word. The permutation with the best score can then be kept.

The N-Best algorithm can be based on an HMM and a discrete estimator. All the possible paths inside the HMMs are created, letter by letter (from the input word). Each path is assigned a score based on the discrete estimator. After each letter, they are pruned to improve computation time. The pruning process is controlled with a pruning coefficient and a maximum number of nodes created. During the whole process, in each path, the worst and best scores are kept up to date to improve pruning performances.

In some instances, missing phonemes should be considered. Even when using the same phonetic alphabet, there may be some differences between languages. From language to language, some symbols are bound to different sounds. In other languages, some phonemes are simply missing. For example, the missing phonemes can be accounted for using the following technique. For each missing phoneme from language source to language target, the possible corresponding graphemes are searched in the language source. If there is a corresponding grapheme that is very probable (P(g)>70) or if the most probable grapheme is much more probable than the second (P(first)>20+P(second)), the corresponding phonemes of this grapheme are obtained in language target. Again, if there is a corresponding phoneme that is very probable (P(p)>70) or if the most probable phoneme is much more probable than the second (P(first)>20+P(second)), the source missing phoneme are mapped to the target found phoneme.

In some instances, acronyms should also be considered. Acronyms are not typically pronounced the same as normal words. They are typically pronounced by spelling letters independently. To handle this case, the g2p mapper can contain a small dictionary with the phonetization of each letter. A special parameter can be set indicating that the input is an acronym and must be phonetized as such. Additionally or alternatively, an IG-Tree can be trained on the phonetizations of acronyms.

Referring back to FIG. 4, at 412, the method continues by accessing a second data structure that maps the one or more universal phonetic representations to one or more graphemes in the second language. The second data structure can comprise a plurality of second nodes with each second node of the plurality of second nodes having a respective weight assigned that corresponds to a likely representation of a grapheme in the second language.

A phoneme-to-grapheme (p2g) mapper does somehow the reverse work of a grapheme-to-phoneme mapper. It converts a phoneme into its written letter form. Some of the techniques presented above can be easily reversed to build p2g mappers. For instance, IG-Tree are pretty much reversible with small effort. However, it is not the case with every technique, as phoneme to grapheme mapping induce some specific problems in some languages. For instance, one of the problems in phoneme-to-grapheme conversion comes from diphthongs and double letters. It means that there are generally more ways to write a word than to pronounce it. A second-order Hidden Markov Model with a Viterbi search can be used or a mix of several techniques can be used to improve the results. In some embodiments, more than one potentially good answer can be returned. For that, the N-best algorithm can be used based on HMMs, as discussed above.

Figure 11:
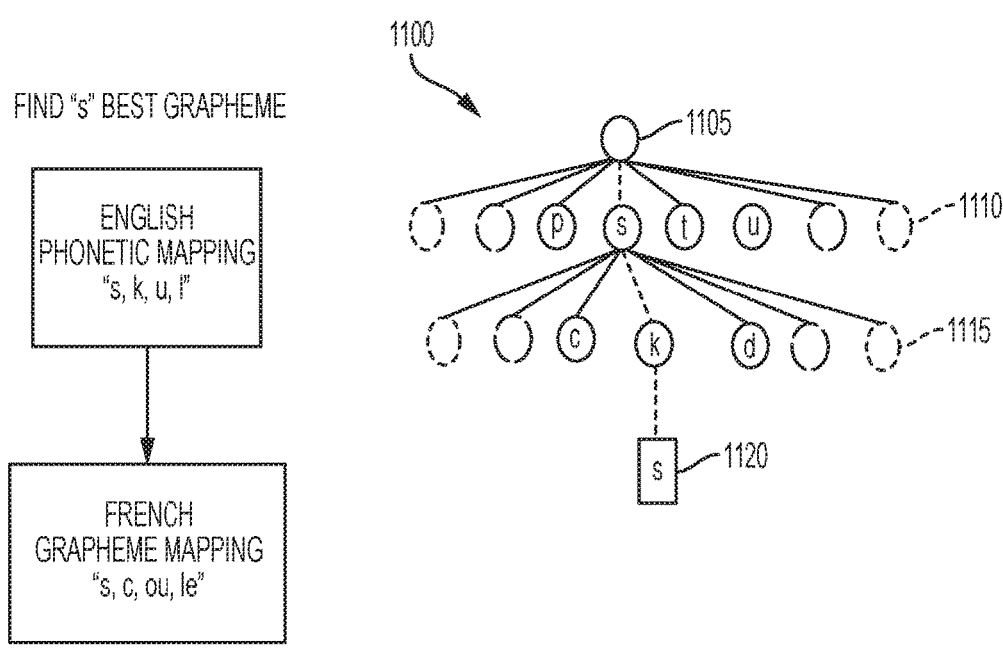
FIG. 11 shows an example IG-Tree for finding the best graphene in French for the phoneme "s" from the example of FIG. 6, according to embodiments.

FIG. 11 shows an example IG-Tree 1100 for finding the best grapheme in French for the phoneme "s" from the example of FIG. 6, according to embodiments. The IG-Tree 1100 has a root node 1105, a first layer 1110, a and second layer 1115. To determine the best grapheme in French for the phoneme "s" in the first layer 1110, the phoneme at the right context location "k" is located in the second layer 1115. At the node 1120, the best grapheme in French, which is "s," is found for the phoneme "s."

FIG. 12 shows an example IG-Tree for finding the best grapheme in French for the phoneme "k" from the example of FIG. 6, according to embodiments. The process of traversing the IG-Tree of FIG. 12 is similar to that of FIG. 11 and the best grapheme in French "c" is found for the phoneme "k."

Figure 13:
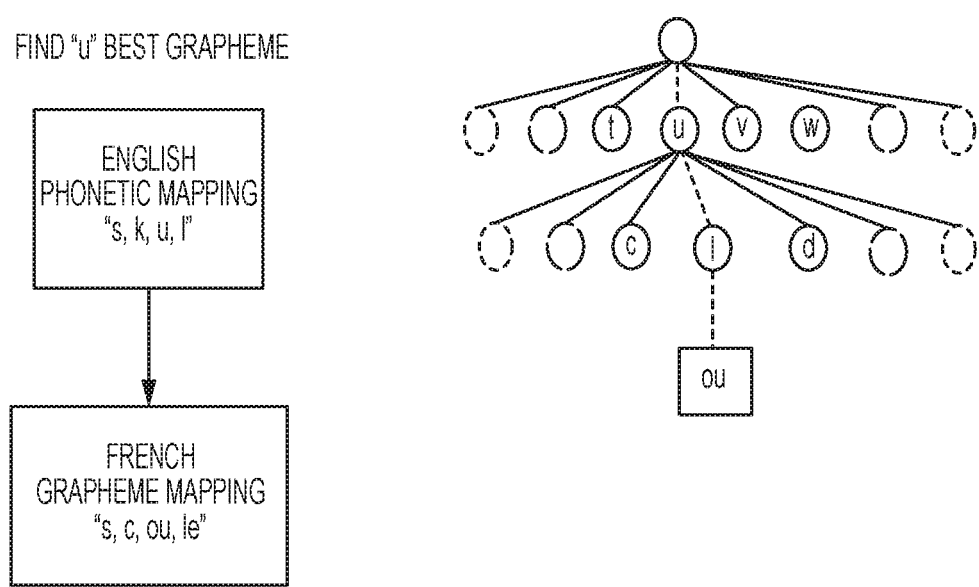
FIG. 13 shows an example IG-Tree for finding the best graphene in French for the phoneme "u" from the example of FIG. 6, according to embodiments.

FIG. 13 shows an example IG-Tree for finding the best grapheme in French for the phoneme "u" from the example of FIG. 6, according to embodiments. The process of traversing the IG-Tree of FIG. 13 is similar to that of FIG. 11 and the best grapheme in French "ou" is found for the phoneme "u."

Figure 14:
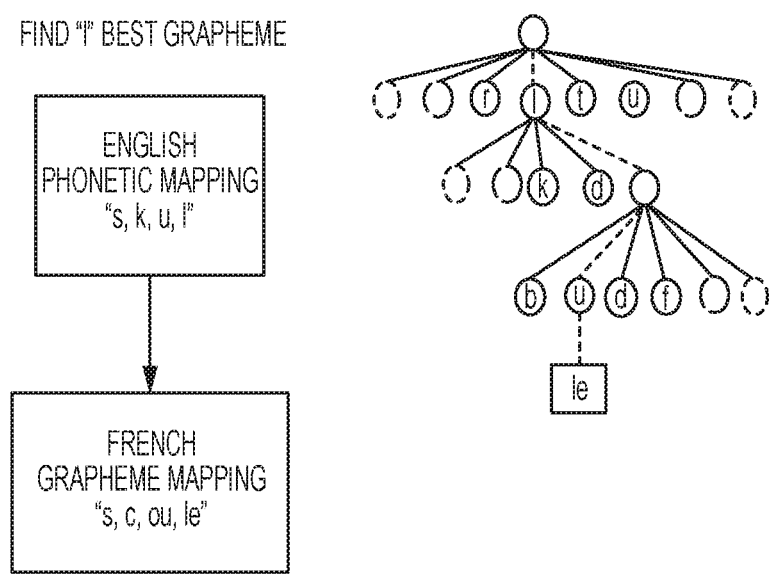
FIG. 14 shows an example IG-Tree for finding the best graphene in French for the phoneme "l" from the example of FIG. 6, according to embodiments.

FIG. 14 shows an example IG-Tree for finding the best grapheme for the phoneme "l" from the example of FIG. 6, according to embodiments. The process of traversing the IG-Tree of FIG. 14 is similar to that of FIG. 11 and the best grapheme in French "le" is found for the phoneme "l."

At 414, the method continues by determining at least one grapheme representation in the second language for one or more of the one or more phonetic representation based on the second data structure. Returning to FIG. 6, the grapheme string in French "s, c, ou, le" is found for the phoneme string "s, k, u, l" at 620 using the IG-Trees of FIGS. 11-14.

Returning again to FIG. 4, at 416, the method continues by constructing the phonetic representation of the string of characters in the second language based on the grapheme representation in the second language that was determined. Returning to FIG. 6, the grapheme string in French "s, c, ou, le" can be constructed and presented to a user to be spoken. At 418, the method can end.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 15:
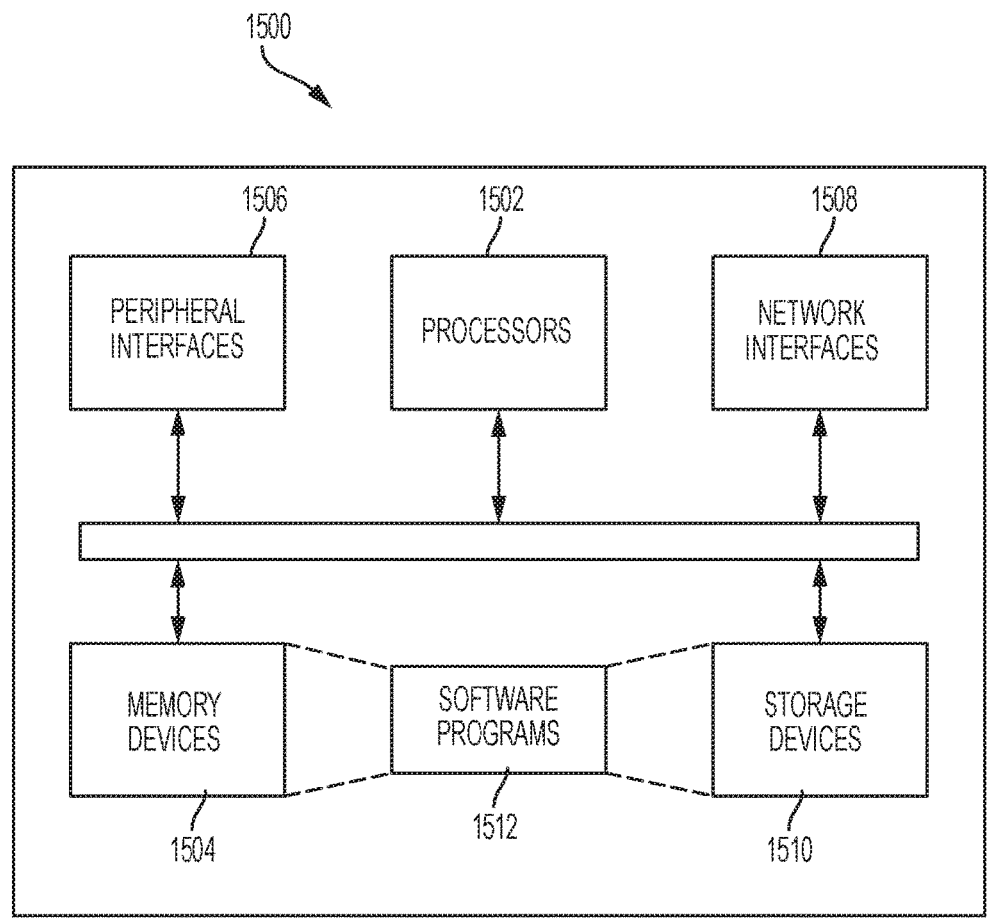
FIG. 15 shows an example computer system according to embodiments.

For example, FIG. 15 illustrates an example of a hardware configuration for a computer device 1500 that can be used as mobile device, which can be used to perform one or more of the processes described above. While FIG. 15 illustrates various components contained in the computer device 1500, FIG. 15 illustrates one example of a computer device and additional components can be added and existing components can be removed.

The computer device 1500 can be any type of computer devices, such as desktops, laptops, servers, etc., or mobile devices, such as smart telephones, tablet computers, cellular telephones, personal digital assistants, etc. As illustrated in FIG. 15, the computer device 1500 can include one or more processors 1502 of varying core configurations and clock frequencies. The computer device 1500 can also include one or more memory devices 1504 that serve as a main memory during the operation of the computer device 1500. For example, during operation, a copy of the software that supports the DNS operations can be stored in the one or more memory devices 1504. The computer device 1500 can also include one or more peripheral interfaces 1506, such as keyboards, mice, touchpads, computer screens, touchscreens, etc., for enabling human interaction with and manipulation of the computer device 1500.

The computer device 1500 can also include one or more network interfaces 1508 for communicating via one or more networks, such as Ethernet adapters, wireless transceivers, or serial network components, for communicating over wired or wireless media using protocols. The computer device 1500 can also include one or more storage device 1510 of varying physical dimensions and storage capacities, such as flash drives, hard drives, random access memory, etc., for storing data, such as images, files, and program instructions for execution by the one or more processors 1502.

Additionally, the computer device 1500 can include one or more software programs 1512 that enable the functionality described above. The one or more software programs 1512 can include instructions that cause the one or more processors 1502 to perform the processes described herein. Copies of the one or more software programs 1512 can be stored in the one or more memory devices 1504 and/or on in the one or more storage devices 1510. Likewise, the data, for example, the alignment data, the first and/or the second data structures (IG-Trees), utilized by one or more software programs 1512 can be stored in the one or more memory devices 1504 and/or on in the one or more storage devices 1510.

In implementations, the computer device 1500 can communicate with other devices via a network 1516. The other devices can be any types of devices as described above. The network 1516 can be any type of network, such as a local area network, a wide-area network, a virtual private network, the Internet, an intranet, an extranet, a public switched telephone network, an infrared network, a wireless network, and any combination thereof. The network 1516 can support communications using any of a variety of commercially-available protocols, such as TCP/IP, UDP, OSI, FTP, UPnP, NFS, CIFS, AppleTalk, and the like. The network 1516 can be, for example, a local area network, a wide-area network, a virtual private network, the Internet, an intranet, an extranet, a public switched telephone network, an infrared network, a wireless network, and any combination thereof.

The computer device 1500 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 1500 as described above need not be enclosed within a single enclosure or even located in close proximity to one another. Those skilled in the art will appreciate that the above-described componentry are examples only, as the computer device 1500 can include any type of hardware componentry, including any necessary accompanying firmware or software, for performing the disclosed implementations. The computer device 1500 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

The invention claimed is:

1. A method of converting a string of characters in a first language into a phonetic representation of a second language, the method comprising:
   receiving the string of characters in the first language;
   parsing the string of characters in the first language into a first string of graphemes in the first language;
   adding one or more characters to the first string of graphemes to represent missing characters in the string of characters to create a second string of graphemes;
   grouping the second string of graphemes into a plurality of pseudo-graphemes based on a probability determined by a trained discrete estimator, wherein two or more graphemes in the string of graphemes that are phonetized together are grouped to a single pseudo-grapheme;
   accessing a first data structure that maps each pseudo-grapheme in the string of pseudo-graphemes in the first language to one or more universal phonetic representations based on an international phonetic alphabet, wherein the first data structure comprises a plurality of first nodes with each first node of the plurality of first nodes having a respective weight assigned that corresponds to a likely pronunciation of a grapheme;
   determining one or more phonetic representations for each pseudo-grapheme in the string of pseudo-graphemes in the first language based on the first data structure;
   accessing a second data structure that maps the one or more universal phonetic representations to one or more graphemes in the second language, wherein the second data structure comprises a plurality of second nodes with each second node of the plurality of second nodes having a respective weight assigned that corresponds to a likely representation of a grapheme in the second language;
   determining at least one grapheme representation in the second language for one or more of the one or more phonetic representation based on the second data structure; and
   constructing the phonetic representation of the string of characters in the second language based on the grapheme representation in the second language that was determined.

2. The method of claim 1, further comprising:
   ranking each grapheme representation in the second language to produce a rank list, wherein the ranking is based on a likelihood that a grapheme representation in the second language sounds similar to a pronunciation sound of the string of characters in the second language; and
   filtering the ranked list to produce a subset of grapheme representations in the second language.

3. The method of claim 2, further comprising determining a first composite weight for the one or more phonetic representations based on the first data structure.

4. The method of claim 2, further comprising determining a second composite weight for the one or more grapheme representations based on the second data structure.

5. The method of claim 4, wherein the filtering is based on the second composite weight.

6. The method of claim 1, further comprising creating the first data structure and the second data structure as information gain trees.

7. A device for converting a string of characters in a first language into a phonetic representation of a second language, the device comprising:
   a memory containing instructions; and
   at least one processor, operably connected to the memory, the executes the instructions to perform operations comprising:
   receiving the string of characters in the first language;
   parsing the string of characters in the first language into a first string of graphemes in the first language;
   adding one or more characters to the first string of graphemes to represent missing characters in the string of characters to create a second string of graphemes;
   grouping the second string of graphemes into a plurality of pseudo-graphemes based on a probability determined by a trained discrete estimator, wherein two or more graphemes in the string of graphemes that are phonetized together are grouped to a single pseudo-grapheme;
   accessing a first data structure that maps each pseudo-grapheme in the string of pseudo-graphemes in the first language to one or more universal phonetic representations based on an international phonetic alphabet, wherein the first data structure comprises a plurality of first nodes with each first node of the plurality of first nodes having a respective weight assigned that corresponds to a likely pronunciation of a grapheme;

determining one or more phonetic representations for each pseudo-grapheme in the string of pseudo-graphemes in the first language based on the first data structure;

accessing a second data structure that maps the one or more universal phonetic representations to one or more graphemes in the second language, wherein the second data structure comprises a plurality of second nodes with each second node of the plurality of second nodes having a respective weight assigned that corresponds to a likely representation of a grapheme in the second language;

determining at least one grapheme representation in the second language for one or more of the one or more phonetic representation based on the second data structure; and constructing the phonetic representation of the string of characters in the second language based on the grapheme representation in the second language that was determined.

8. The device of claim 7, wherein the at least one processor is further operable to perform the method comprising:

ranking each grapheme representation in the second language to produce a rank list, wherein the ranking is based on a likelihood that a grapheme representation in the second language sounds similar to a pronunciation sound of the string of characters in the second language; and filtering the ranked list to produce a subset of grapheme representations in the second language.

9. The device of claim 8, wherein the at least one processor is further operable to perform the method comprising determining a first composite weight for the one or more phonetic representations based on the first data structure.

10. The device of claim 8, wherein the at least one processor is further operable to perform the method comprising determining a second composite weight for the one or more grapheme representations based on the second data structure.

11. The device of claim 10, wherein the filtering is based on the second composite weight.

12. The device of claim 7, wherein the at least one process is further operable to perform the method comprising creating the first data structure and the second data structure as information gain trees.

13. A non-transitory computer-readable medium comprising computer-interpretable instructions which, when executed by at least one electronic processor, cause the at least one electronic processor to perform a method of converting a string of characters in a first language into a phonetic representation of a second language, the method comprising:

receiving the string of characters in the first language;

parsing the string of characters in the first language into a first string of graphemes in the first language;

adding one or more characters to the first string of graphemes to represent missing characters in the string of characters to create a second string of graphemes;

grouping the second string of graphemes into a plurality of pseudo-graphemes based on a probability determined by a trained discrete estimator, wherein two or more graphemes in the string of graphemes that are phonetized together are grouped to a single pseudo-grapheme;

accessing a first data structure that maps each pseudo-grapheme in the string of pseudo-graphemes in the first language to one or more universal phonetic representations based on an international phonetic alphabet, wherein the first data structure comprises a plurality of first nodes with each first node of the plurality of first nodes having a respective weight assigned that corresponds to a likely pronunciation of a grapheme;

determining one or more phonetic representations for each pseudo-grapheme in the string of pseudo-graphemes in the first language based on the first data structure;

accessing a second data structure that maps the one or more universal phonetic representations to one or more graphemes in the second language, wherein the second data structure comprises a plurality of second nodes with each second node of the plurality of second nodes having a respective weight assigned that corresponds to a likely representation of a grapheme in the second language;

determining at least one grapheme representation in the second language for one or more of the one or more phonetic representation based on the second data structure; and constructing the phonetic representation of the string of characters in the second language based on the grapheme representation in the second language that was determined.

14. The non-transitory computer-readable medium of claim 13, further comprising:

ranking each grapheme representation in the second language to produce a rank list, wherein the ranking is based on a likelihood that a grapheme representation in the second language sounds similar to a pronunciation sound of the string of characters in the second language; and filtering the ranked list to produce a subset of grapheme representations in the second language.

15. The non-transitory computer-readable medium of claim 14, further comprising determining a first composite weight for the one or more phonetic representations based on the first data structure.

16. The non-transitory computer-readable medium of claim 14, further comprising determining a second composite weight for the one or more grapheme representations based on the second data structure.

17. The non-transitory computer-readable medium of claim 16, wherein the filtering is based on the second composite weight.

18. The non-transitory computer-readable medium of claim 13, further comprising creating the first data structure and the second data structure as information gain trees.

* * * * *